H. F. BICKEL.
AIR BRAKE APPARATUS.
APPLICATION FILED OCT. 29, 1914.
1,124,202.
Patented Jan. 5, 1915.
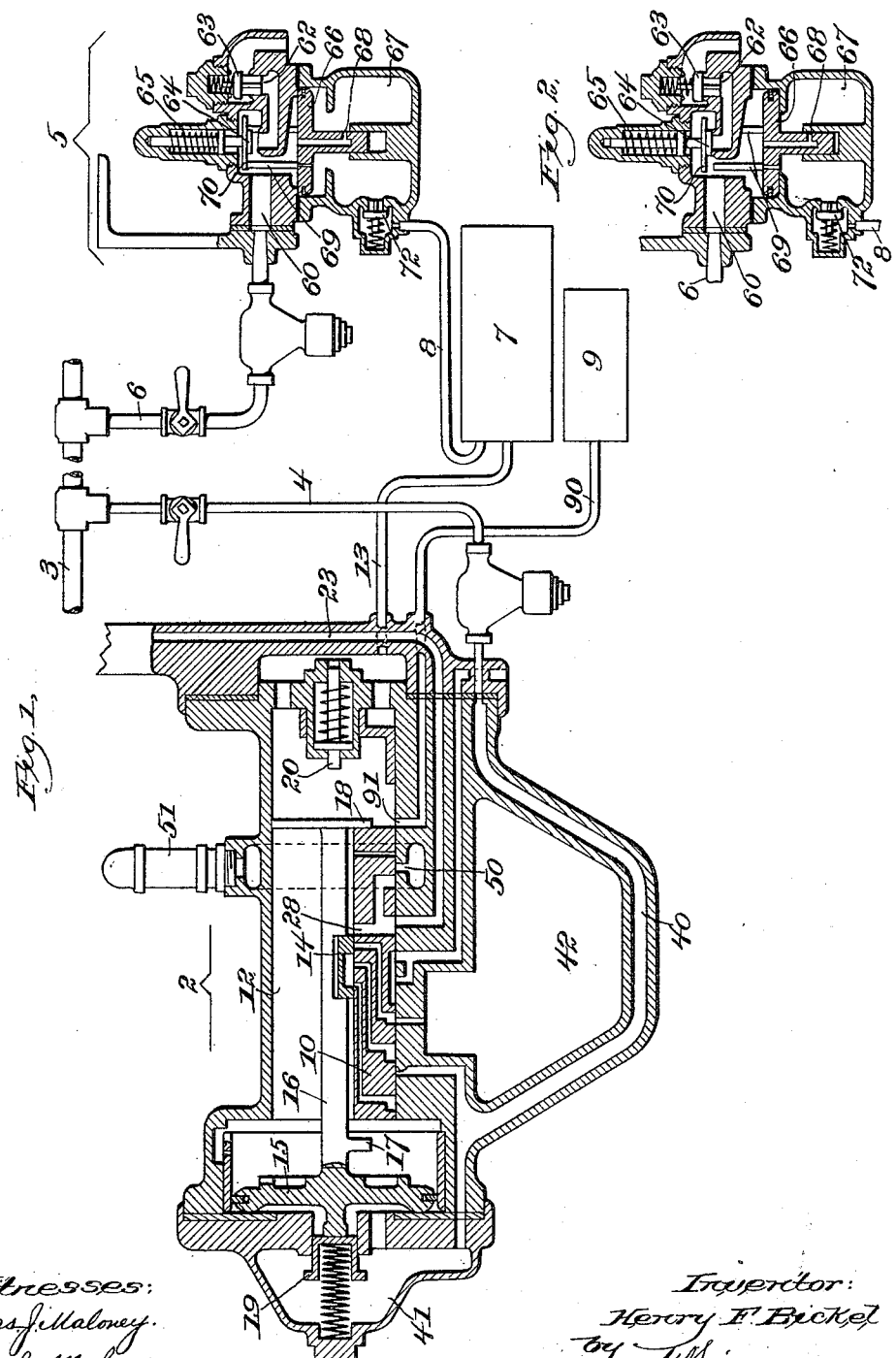

UNITED STATES PATENT OFFICE.

HENRY F. BICKEL, OF PLAINFIELD, NEW JERSEY, ASSIGNOR TO NEW YORK AIR BRAKE COMPANY, A CORPORATION OF NEW JERSEY.

AIR-BRAKE APPARATUS.

1,124,202.     Specification of Letters Patent.     Patented Jan. 5, 1915.

Original application filed April 23, 1914, Serial No. 833,906. Divided and this application filed October 29, 1914. Serial No. 869,338.

*To all whom it may concern:*

Be it known that I, HENRY F. BICKEL, a citizen of the United States, residing in Plainfield, in the county of Union and State of New Jersey, have invented an Improvement in Air-Brake Apparatus, of which the following description, in connection with the accompanying drawings, is a specification, like numerals on the drawings representing like parts.

This invention relates to an air brake apparatus and is embodied in the car equipment of an automatic air brake apparatus of the kind now generally in use.

The object of the invention is to improve the action of the brakes, especially in passenger train equipments, and to increase the promptness of the action under the control of the engineer in the various conditions of operation.

The apparatus herein shown and described embodies a novel construction and organization of the appliances which operate in emergency applications in which organization the local vent for reducing train pipe pressure is operated independently of the triple valve piston, and vents to the atmosphere, and provision is made for augmenting the pressure in the brake cylinders that is obtainable from the auxiliary reservoirs in service applications. An emergency application with the augmented brake cylinder pressure can be produced at any time even when the brakes are already applied with any brake cylinder pressure up to the maximum obtainable in a service application.

Some of the advantages of the improvements will be pointed out in connection with the description of the construction and operation of the apparatus embodying said improvements and represented in the accompanying drawings.

While the drawings represent the essential structural components and their operative relations to each other, they are somewhat in the nature of diagrams, being represented as if the various ports and passages were all in the plane of section instead of in different planes as they would be made in the commercial constructions for the sake of compactness and convenience of construction.

Figure 1 shows the components of the car equipment, except the brake cylinder and brake rigging, with the several component structures in section and with the parts in the position assumed in making an emergency application; and Fig. 2 is a sectional view of the emergency train pipe vent valve in the position assumed at all times except when an emergency application is being made and the parts are moved to the position shown in Fig. 1.

Referring to Fig. 1 the components included in the car equipment are the triple valve 2, in connection with the train pipe 3, by branch 4 and the emergency vent valve 5 connected with the train pipe 3 by branch 6 and also with the auxiliary reservoir 7 by a pipe or connection 8 that will be described, the equipment further including besides the auxiliary reservoir 7 a supplementary reservoir 9 connected by pipe 90 with the triple valve 2 and controlled as to its communication with other components by said triple valve. The supplementary reservoir 9 may be of smaller capacity than the auxiliary reservoir 7 and it is normally charged with the same pressure as that in the auxiliary reservoir when fully charged, said pressure being retained in the supplementary reservoir while service applications of the brakes are being made and being available for augmented brake cylinder pressure when an emergency application is made whether the brakes are already applied or not, and also being available for augmenting auxiliary reservoir pressure at the moment when the brakes are released and before the auxiliary reservoir has been fully recharged from the train pipe. Referring to Fig. 1, the main structural components of the triple valve include the main slide valve 10 working on a valve seat in the main chamber 12 of the triple valve body which is in constant free communication with the auxiliary reservoir 7 by the pipe or passage 13 as usual. The triple valve parts also include the supplementary valve 14 which operates on a seat on the main slide valve 10 and is connected with the triple valve piston 15 by the stem 16 thereof which has projections 17, 18 for engaging the main valve 10 and moving the same after a short independent movement of the piston and auxiliary valve 14 which shifts the latter relative to the main valve all as usual in this general class of apparatus. The triple valve piston 15 is acted upon at one side (the right hand side as shown in the drawings) by the auxiliary reservoir pressure in the chamber 12, and at the other side by train pipe pressure admitted from the train pipe branch 4 through the port 40 into the chamber 41 at the left hand side of the triple valve piston 15. A supplementary train pipe chamber or reservoir 42 is provided, herein shown as formed or contained in the main body of the triple valve. A yielding stop 19 operates to arrest the movement of the triple valve piston and parts actuated thereby when acted upon by a preponderance of auxiliary reservoir pressure over train pipe pressure, said stop arresting the piston if the preponderance is comparatively small as in making service applications, but yielding to permit a further movement of the said piston to the position shown in Fig. 1 when the preponderance is large as in the case of an emergency application of the brakes. A similar yielding stop 20 arrests the movement of the triple valve piston and the parts actuated thereby when acted upon by a moderate preponderance of train pipe pressure over auxiliary reservoir pressure but yields to permit a further movement toward the right when train pipe pressure has a greater preponderance over auxiliary reservoir pressure.

The specific construction of the triple valve is not essential to the appliance for venting the train pipe in emergency applications which forms the special subject of this application, but a detailed description of the mode of operation of the triple valve herein shown, may be had by reference to application Serial Number 833,906, filed April 23, 1914, of which the present application is a division.

The construction and mode of operation of the appliances for making emergency applications of the brakes are as follows: In order to make an emergency application of the brakes the train pipe pressure is suddenly reduced the same as with the apparatus now in general use, this reduction calling into action local train pipe vent valves which augment the reduction of train pipe pressure and hasten its action throughout the length of the train in a manner now well understood. In the apparatus now most generally used the train pipe vent valve for venting the train pipe in emergency applications is operated or controlled by the triple valve piston in its movement beyond the position at which it is arrested by a yielding stop the action of which relative to the triple valve piston is similar to that of the stop 19 of the construction herein shown. In the present construction, however, the train pipe vent valve for operating in emergency applications is entirely independent of the triple valve piston, and as herein shown is included in a structurally separate appliance shown at 5 in Fig. 1 and shown in its normal or inactive position in Fig. 2. As shown in Fig. 2 the said emergency venting device contains a chamber 60 communicating with the train pipe through the passage 6 as shown in Fig. 1, said chamber 60 having an outlet 62 containing an outwardly opening check valve 63 and being controlled by a valve 64 normally held seated by the action of the spring 65 and by the train pipe pressure in the chamber 60. A piston 66 works in a short cylindrical chamber and is interposed between the train pipe chamber 60 and a pressure chamber 67 which is charged to train pipe pressure through a small feed passage 68 through or past the piston 66. When the piston 66 is in normal position shown in Fig. 2, the feed passage 68 is obstructed or partially closed by the guide socket for the piston stem as shown in Fig. 2 so that flow of train pipe air into the pressure chamber 67 for charging the same is comparatively slow. In moderate reductions of train pipe pressure such as are made in service applications of the brakes, the pressure in the chamber 60 is correspondingly reduced leaving the pressure in the chamber 67 in preponderance and causing it to lift the piston 66. Such movement of the piston 66 will, however, be arrested when the pins 69 encounter the flange or projection 70 of the valve 64 and in this position the opening of the feed passage 68 through the piston 66 is withdrawn from the guide passage leaving the said feed passage comparatively free so that pressure from the chamber 67 will flow back into the train pipe without producing sufficient preponderance of pressure on the piston 66 to unseat the valve 64. In case, however, of a sudden large drop in train pipe pressure such as is effected by the engineer to produce an emergency application of the brakes, the pressure in the chamber 67 will be left sufficiently in preponderance to cause the piston 66 to unseat the valve 64 as shown in Fig. 1 and thus permit train pipe air to escape through the passage 62 past the check valve 63, thus affording a large local vent from the train pipe and thereby hastening the action of the train pipe reduction on the other equipments as is well understood. The spring acting on the check valve 63 may be set to retain a certain amount of pressure so that the train pipe need not be wholly depleted of air in making an emergency application. The effect of the sudden large drop in train pipe pressure, which thus takes place in an emergency application, on the triple valve is to cause the auxiliary reservoir pressure to preponderate sufficiently to overcome the yielding stop 19 and cause the triple valve piston to make its full traverse to the left as shown in Fig. 1. In the position of the main valve 10 thus produced the port 28 will be in communication with the brake cylinder port 23 and the port 91 from the supplementary reservoir 9 will also be uncovered and the port 50 leading to the relief valve 51 will be closed so that the pressure in the brake cylinder may be increased above the maximum obtainable in a service application. It will be understood that the movement of the triple valve parts to the emergency position shown in Fig. 1 may take place at any time whether the triple valve is in normal or running position, or in the service application position, with the effect that the relief passage 50 from the brake cylinder will be closed, and the brake cylinder pressure will be augmented by pressure from the supplementary reservoir 9. The venting of the train pipe through the valve 64 takes place very rapidly and the pressure in the chamber 67 falls rapidly and when approximately down to that in the train pipe the valve 64 is closed by the action of its spring 65. When air is again introduced into the train pipe to release the brakes it will force the piston 66 down and will cause the chamber 67 to be recharged through the feed passage 68 as has been before explained. To avoid charging the chamber 67 substantially above normal train pipe pressure as might perhaps take place by reason of the high pressure introduced to the train pipe in the release operation, the communication 8 to the auxiliary reservoir 7 through the check valve 72, permits air to pass from the chamber 67 into the auxiliary reservoir 7 in case the pressure in the former is higher than that in the latter and thus danger of overcharging the chamber 67 is avoided. Except for this provision a sufficient pressure might perhaps be introduced into the chamber 67 to operate the vent valve when train pipe pressure falls to normal in the further charging of the auxiliary reservoir attendant upon the operation of releasing the brakes. The check valve 72, however, prevents pressure from the auxiliary reservoir 7, entering the chamber 67 and affecting the operation or control of the vent valve 64. It will be recognized that the supplementary reservoir 9 is inactive under all conditions described except in an emergency application, in which it augments the brake cylinder pressure, and in the release operation in which it initially hastens the recharging of the auxiliary reservoir; and except for the performance of these functions the said supplementary reservoir might be omitted while all the other functions of the apparatus would be retained.

By having the emergency venting appliance controlled independently of the triple valve piston, the operation of the apparatus will not be impaired by a defective triple valve. On the other hand, if the emergency venting appliance should be defective it could be cut out of operation without affecting the action of the triple valve and the remainder of the equipment pertaining to the same car, and without appreciably affecting the action of the brakes throughout the train even in emergency applications, as the vents in the remaining equipments would be sufficient to bring on the characteristic emergency operation. Furthermore, a single emergency venting appliance may be used on each car equipment whether such equipment comprises only one triple valve and appurtenances or two such equipments are used on each car, as is sometimes the case with large heavy passenger cars.

An equipment of the herein described construction will operate promptly in connection with other equipments of the same construction or with any standard equipment of the constructions now generally in use.

It sometimes happens that through some defect or lack of care a triple valve may stick and fail to move in the service operation until the train pipe pressure has fallen several pounds below the auxiliary reservoir pressure the preponderance of which will then be sufficient to move the triple valve piston throughout its entire stroke overcoming the yielding stop 19 when the main valve finally breaks away.

When the local train pipe vent is controlled by the triple valve piston as is commonly the case in the apparatus heretofore used such movement of any one of the triple valve pistons would effect the opening of the corresponding local train pipe vent valve which would be likely to bring on an emergency application throughout the length of the train when only a moderate service application was intended. With the construction herein shown, however, it will be seen that such defective operation of one of the triple valves would produce no effect further than to momentarily place the auxiliary reservoir 7 and the supplementary reservoir 8 in communication with the brake cylinder but such communication would be cut off as soon as the pressure in said reservoirs had fallen to train pipe pressure, with the result that only a somewhat greater pressure would be produced in the brake cylinder of that equipment than on the other cars of the train. There is much less likelihood of such defective action of one of the vent valves 5 of the construction herein shown, as there are no slide valves to be moved by the piston 66 and there is but little likelihood of the pressure in the chamber 67 being greatly in excess of train pipe pressure except when the latter is dropped very suddenly and largely as by the movement of the engineer's valve to emergency position, or by the breaking apart of the train and the train pipe, which are the conditions that are to effect an emergency application of the brakes in accordance with the intended mode of operation of the apparatus.

What I claim is:

The combination of the auxiliary reservoir and train pipe, of an air brake apparatus, with a train pipe vent valve and actuating piston therefor subjected to train pipe pressure on one side and to pressure in a pressure chamber at the other side, and a feed passage from the train pipe to the pressure chamber, and a communication from the pressure chamber to the auxiliary reservoir and check valve therein which permits flow from the pressure chamber to the auxiliary reservoir but prevents flow in the reverse direction.

In testimony whereof, I have signed my name to this specification in the presence of two subscribing witnesses.

HENRY F. BICKEL.

Witnesses:
FRED W. SILL,
WILLIAM F. NICOL.

Copies of this patent may be obtained for five cents each, by addressing the "Commissioner of Patents, Washington, D. C."